United States Patent
Waller et al.

(10) Patent No.: US 10,622,654 B2
(45) Date of Patent: Apr. 14, 2020

(54) APPARATUS, SYSTEM AND METHOD FOR COMPACT MOBILE FUEL CELL SYSTEM

(71) Applicants: Michael Waller, Rochester, NY (US); Mark Walluk, Rochester, NY (US); Thomas Trabold, Rochester, NY (US); Michael Bradley, Irondequoit, NY (US)

(72) Inventors: Michael Waller, Rochester, NY (US); Mark Walluk, Rochester, NY (US); Thomas Trabold, Rochester, NY (US); Michael Bradley, Irondequoit, NY (US)

(73) Assignee: Rochester Insitute of Technology, Rochester, NY (US)

( * ) Notice: Subject to any disclaimer, the term of this patent is extended or adjusted under 35 U.S.C. 154(b) by 284 days.

(21) Appl. No.: 15/191,781

(22) Filed: Jun. 24, 2016

(65) Prior Publication Data

US 2017/0110749 A1 Apr. 20, 2017

Related U.S. Application Data

(60) Provisional application No. 62/242,738, filed on Oct. 16, 2015, provisional application No. 62/183,885, filed on Jun. 24, 2015.

(51) Int. Cl.
*H01M 8/06* (2016.01)
*H01M 8/0612* (2016.01)
*H01M 8/103* (2016.01)

(52) U.S. Cl.
CPC ......... *H01M 8/0618* (2013.01); *H01M 8/103* (2013.01); *H01M 2250/20* (2013.01)

(58) Field of Classification Search
CPC ............ H01M 8/0612; H01M 8/0618; H01M 8/0625; H01M 8/1018; H01M 8/102;
(Continued)

(56) References Cited

U.S. PATENT DOCUMENTS

2002/0160239 A1 10/2002 Cutright et al.
2003/0230671 A1 12/2003 Dunn
(Continued)

OTHER PUBLICATIONS

Bradley, T.H., Moffitt, B.A., Marvris, D.N., and Parekh, D.E., Development and experimental characterization of a fuel cell powered aircraft, Journal of Power Sources, vol. 171, Issue 2, Sep. 27, 2007, pp. 793-801, ISSN 0378-7753, http://dx.doi.org/10.1016/j.jpowsour.2007.06.215. (http://www.sciencedirect.com/science/article/pii/S0378775307013213).

Kim, K., Kim, T., Lee, K., and Kwon, S., Fuel cell system with sodium borohydride as hydrogen source for unmanned aerial vehicles, Journal of Power Sources, vol. 196, Issue 21, Nov. 1, 2011, pp. 9069-9075, ISSN 0378-7753, http://dx.doi.org/10.1016/j.jpowsour.2011.01.038. (http://www.sciencedirect.com/science/article/pii/S0378775311001169).

(Continued)

*Primary Examiner* — Raymond Alejandro
(74) *Attorney, Agent, or Firm* — Bond, Schoeneck & King, PLLC; Joseph Noto

(57) ABSTRACT

A system, method, and apparatus for fuel cell utilizing hydrogen from reforming propane fuel include a propane fuel reformer, controlling operating parameters of $O_2/C$ ratio, pressure, and catalyst temperature, and a high temperature proton exchange membrane fuel cell (HT-PEMFC) controlling operating parameters of pressure and temperature. For mobile application, the system includes a 3D printed reformer for generation of hydrogen rich gas.

10 Claims, 7 Drawing Sheets

(58) Field of Classification Search
CPC .............. H01M 8/103; H01M 8/04925; H01M 8/0494; H01M 8/04701; H01M 8/04731; H01M 8/04738; H01M 8/04746; H01M 8/04776; H01M 2250/20
See application file for complete search history.

(56) References Cited

U.S. PATENT DOCUMENTS

| | | | |
|---|---|---|---|
| 2009/0075131 A1* | 3/2009 | Katsuno | B01J 20/0225 429/410 |
| 2012/0086385 A1 | 4/2012 | Masouras et al. | |
| 2012/0183871 A1 | 7/2012 | Kim et al. | |
| 2013/0183603 A1* | 7/2013 | Benicewicz | H01M 8/103 429/465 |
| 2015/0010874 A1 | 1/2015 | Ghazvini et al. | |

OTHER PUBLICATIONS

Aguiar, P., Brett, D.J.L., and Brandon, N.P., Solid oxide fuel cell/gas turbine hybrid system analysis for high-altitude long-endurance unmanned aerial vehicles, International Journal of Hydrogen Energy, vol. 33, Issue 23, Dec. 2008, pp. 7214-7223, ISSN 0360-3199, http://dx.doi.org/10.1016/j.ijhydene.2008.09.012. (http://www.sciencedirect.com/science/article/pii/S036031990801135X).

Waller, M.G., Walluk, M.R., and Trabold, T.A., Operating envelope of a short contact time fuel reformer for propane catalytic partial oxidation, Journal of Power Sources, vol. 274, Jan. 15, 2015, pp. 149-155, ISSN 0378-7753, http://dx.doi.org/10.1016/j.jpowsour.2014.10.025. (http://www.sciencedirect.com/science/article/pii/S0378775314016346).

* cited by examiner

APPARATUS, SYSTEM AND METHOD FOR COMPACT MOBILE FUEL CELL SYSTEM

CROSS REFERENCE

This application claims the benefit of the filing date of U.S. Provisional Patent Application Ser. No. 62/183,885, filed Jun. 24, 2015 and U.S. Provisional Patent Application Ser. No. 62/242,738, filed Oct. 16, 2015, which is hereby incorporated by reference in its entirety.

This invention was made with government support under grant number 70NANB14H262 awarded by the National Institute of Standards and Technology. The government has certain rights in this invention.

FIELD

The disclosure relates to apparatus, system and method for fuel cell, and more particularly for systems utilizing hydrogen from reforming propane fuel.

BACKGROUND

The Environmental Protection Agency (EPA) has estimated that 5% of air pollutants originate from small internal combustion engines (ICE) used in non-automotive applications. While there have been significant advances towards developing more sustainable systems to replace large ICEs, few designs have been implemented with the capability to replace small ICEs. Replacing small ICEs presents a unique opportunity for early market penetration of fuel cell technologies.

Conventional proton exchange membrane (PEM) fuel cell systems suffer from requiring high purity hydrogen. For mobile fuel cell systems, this necessitates a costly on-board hydrogen storage tank to be incorporated into the overall system design. One method to overcome this barrier is to use an on-board reforming system fueled by some sort of hydrocarbon. Hydrocarbon reforming processes (i.e., partial oxidation, steam reforming, or auto-thermal reforming) generate effluent gas compositions that typically contain various amounts of hydrogen, carbon monoxide, carbon dioxide, nitrogen, and water. Unfortunately though, most fuel reforming processes generate significant amounts of impurities, such as CO and $CO_2$, requiring a costly and complex upfront clean-up system that is unwieldy for a practical system.

Currently, the art lacks a compact high temperature PEM fuel cell capable of operating on lower quality reformed hydrogen generated by an on-board fuel reforming system.

SUMMARY

In accordance with one aspect of the present disclosure an integrated fuel cell power system includes a propane reformer including a propane intake, an air intake, and a catalytic partial oxidation catalyst, wherein the reformer operates at an $O_2/C$ ratio from about 0.5 to about 0.65, pressure from about 100 kPa to about 300 kPa, and catalyst temperature from about 800° C. to about 1000° C. to produce hydrogen while minimizing creation of soot to at or below about 0.02 mg/m$^3$ and carbon monoxide from about 5% to about 25%; and a high temperature proton exchange membrane fuel cell including a pyridine polymer membrane, wherein the fuel cell operates within a temperature range from about 160° C. to about 205° C. and at pressures between about 100 kPa to about 300 kPa to produce electricity from the reformate.

In accordance with another aspect the present disclosure further includes a method for generating electricity from propane reformate including controlling the propane intake, air intake, and catalytic partial oxidation catalyst operating conditions of a propane reformer to an $O_2/C$ ratio from about 0.5 to about 0.65, pressure from about 100 kPa to about 300 kPa, and catalyst temperature from about 800° C. to about 1000° C. to produce hydrogen while minimizing creation of soot to at or below about 0.02 mg/m$^3$ and carbon monoxide from about 5% to about 25%; and controlling the operating parameters of a high temperature proton exchange membrane fuel cell having a pyridine polymer membrane, wherein the fuel cell is operated within a temperature range from about 160° C. to about 205° C. and at pressures between about 100 kPa to about 300 kPa to produce electricity from the reformate.

In accordance with another aspect the present disclosure further includes a compact mobile integrated fuel cell power system including a 3D printed propane fuel reformer; and a high temperature proton exchange membrane fuel cell, wherein system produces 360 W of power weighing no more than 2.4 kg within a 4.3 L volume.

These and other aspects of the present disclosure will become apparent upon a review of the following detailed description and the claims appended thereto.

BRIEF DESCRIPTION OF THE DRAWINGS

The disclosure may be more completely understood in consideration of the detailed description of various embodiments of the disclosure that follows in connection with the accompanying drawings, in which.

DETAILED DESCRIPTION

Figure 1:
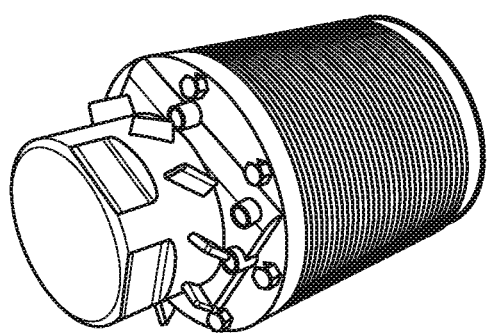
FIG. 1 illustrates a conceptual drawing of an integrated compact mobile HT-PEM for unmanned aerial vehicle (UAV) applications, in accordance with an embodiment of the present disclosure.

The present disclosure relates to a system, method, and apparatus for fuel cell, and more particularly for systems utilizing hydrogen from reforming propane fuel. In an embodiment, the system includes a propane fuel reformer and a high temperature proton exchange membrane fuel cell (HT-PEMFC). An embodiment includes a 3D printed reformer for generation of hydrogen rich gas. While the present disclosure is not necessarily limited to the embodiments shown herein, various aspects of the disclosure may be appreciated by those of skill in the art.

In accordance with an embodiment of the present disclosure a mobile fuel reformer produces hydrogen, soot and carbon monoxide, among other gaseous constituents, from propane and air for use in a HT-PEMFC stack. In an embodiment, a fuel tank containing liquid and/or gaseous propane supplies pressurized fuel to the mobile reformer along with air, preferably pressurized, which can be supplied by an auxiliary system. These two reactants, fuel and air, are mixed within the reformer where they pass over a catalyst and are converted into a gaseous hydrogen-rich stream that passes through a manifold into the fuel cell stack. Specific designs target unmanned vehicle applications that, unlike stationary reformers, produce hydrogen rich fuel from propane and air without a separate supply of water.

In an embodiment, the reformer is operated under desired operating conditions controlled by methods known to those skilled in the art. For example, air and fuel can be controlled using flow regulators, such as a needle valve. Operating conditions include diatomic oxygen to carbon ratio ($O_2/C$) maintained from about 0.5 to about 0.65 and preferably from about 0.52 to about 0.57, pressure from about 100 kPa to about 300 kPa, preferably about 150 kPa to about 200 kPa, and catalyst temperature maintained from about 800° C. to about 1000° C., preferably from about 900° C. to about 980° C., and more preferably from about 920° C. to about 960° C. In an embodiment, optimal production of hydrogen while minimizing creation of undesired byproducts can be achieved by controlling operating parameters at an $O_2/C$ ratio of about 0.53, pressure of about 200 kPA, and catalyst temperature of about 940° C. Byproducts, such as soot at a concentration of about 0.02 mg/m$^3$, preferably at or below about 0.02 mg/m$^3$, and carbon monoxide at a concentration of from about from about 5% to about 25%, 10 mole % to about 25 mole %, as well as CO concentrations above about 16 mole %, including a concentration of about 23 mole % can be produced. The reformer produces water at a concentration of up to about 6 mole %. The temperature of the reformer can be controlled via methods known in the art, such as a combination of insulation and an active air-cooling system, such as using a fan. The gas hourly space velocity of reactants through the reformer is dictated by the geometric design of the reformer for the power range required for the application. This gas hourly space velocity is defined as the volumetric ratio of the entering air and fuel to the reactor volume (catalyst bed volume), where the desired gas hourly space velocity ranges from the preferred values of about 900 per hour up to about 10,000 per hour.

A suitable catalyst for use in the present disclosure contains platinum group metals. Catalytic material containing platinum group metals includes platinum, palladium, rhodium, ruthenium, and iridium. A specific catalyst composition includes about 1 to 2% by weight rhodium on a ceramic monolith ceria-zirconia based substrate or metal monolith. The inlet gas feeds for a selected power output can be controlled, for example, passively using orifices sized for the desired power output. When controlled actively, electronic proportional valves can be used that maintain the desired flow rates required to generate the desired amount of power, by methods known in the art.

In accordance with an embodiment of the present disclosure, a HT-PEMFC uses hydrogen fuel to produce electricity. The hydrogen produced by the reformer is supplied along with air from a compressor or the atmosphere to the HT-PEMFC stack, utilizing a polybenzimidazole (PBI) membrane, for the production of electrical power. The fuel cell operating conditions are controlled in manner known to those skilled in the art. The stack is operated within a temperature range from about 160° C. to about 205° C. and preferably from about 185° C. to about 200° C. and at pressures from about 100 kPa to about 300 kPa, preferably from about 150 kPa to about 200 kPa, with water at a mole concentration up to about 6 percent. Water produced in the reformate is not removed from the fuel cell reactants. The HT-PEMFC stack in accordance with the present disclosure can operate effectively at CO concentrations of from about 5 mole % to about 25 mole %, as well as CO concentrations above about 16 mole %, including a concentration of about 23 mole %. A preferred proton exchange membrane for use in the present disclosure is polybenzimidazole (PBI), although other polymer membranes such as pyridine polymer types can be used. Flow rates of the effluent gas generated by the fuel reformer are controlled to such a rate that maintains the stoichiometric ratio of the hydrogen concentration in the anode between about 1.1 and about 1.5 by methods known in the art.

Durability of the fuel cell system can be impacted by the break-in, and startup/shutdown protocols employed. A suitable break-in procedure of the HT-PEMFC includes heating the stack up to about 160° C. while pure hydrogen gas and air with stoichiometric ratios of about 1.5 and about 2.0, respectively, is flowing at the anode and cathode, respectively, at a current density of about 0.2 Amp/cm$^2$. The stack is maintained at atmospheric pressure and run under these conditions for about 24 hours.

For startup of the stack HT-PEMFC stack is heated up to operating temperature, then flow fuel to the anode first for more than about 10 seconds. Then air flow to the cathode is initiated while maintaining a substitute resistive load that drives stack cell potentials below about 0.8 V. Once the fuel cell stack reaches a steady state power output, the stack can be operated at the desired power loading with preferred current densities up to about 0.6 A/cm$^2$ and permitted short term operation to about 1.0 A/cm$^2$.

For shutdown; the primary load is shut off and the substitute resistive load is engaged to maintain cell potentials below about 0.8 V. Then air flow is shut off to the cathode and the substitute resistive load maintained until the cell voltage drops to below about 0.2 V. Next, a port is opened to allow the hydrogen rich anode gas feed to fill both the anode and cathode of the HT-PEMFC stack, ensuring that the voltage of the stack remains below about 0.2 V. The stack is purged for a period of time, about 60 seconds, that allows for adequate removal of $H_2O$ and $O_2$ from the test cell. Both the inlet and exhaust ports of the anode and cathode of the stack are sealed, by ball valves or similar methods, until the stack is used again.

Applications that do not have limitations on mass, volume or water supply can run the reformer under steam, autothermal or oxidative steam reforming conditions. These reforming methods are alternatives to the catalytic partial oxidation described above. These alternative methods operate with a separate supply of water or recirculating the effluent from the HT-PEMFC stack. An embodiment recirculates a portion of the effluent from the anode side of the stack to the outlet of the reformer where it is mixed with the hydrogen-rich stream from the catalyst. This increases the overall system efficiency by capturing unused hydrogen while beneficially adding additional water vapor to the stack. In another embodiment, a portion of the effluent from the cathode side of the HT-PEMFC stack, containing water created within the stack reaction ($H_2+O_2$), is diverted to the inlet of the reformer where it is mixed with the fuel and air. This increases the water available for the reaction, thus shifting to a higher hydrogen to carbon monoxide concentration ratio for increased system efficiency. In either embodiment, a compressor, ejector or combination can be used to create the flow of stack effluent required at the reformer.

A reformer assembly is used to create the hydrogen-rich gas stream for fueling the HT-PEMFC. The reformer can be fabricated by additive manufacturing processing as known in the art, also known as 3D printing. The 3D printed reformer assembly is an integrated assembly composed of the combination of any of the following components which can be made through a series of additive manufacturing and conventional processes: fuel reformer with or without printed catalyst substrate, reactant gas mixing manifold to the reformer, compressor housing, pressure regulator housing, flame arrestor, heat recuperator, valve seats, mounting interface to vehicle frame, heat exchanger, temperature sensor ports, orifices, and reformer effluent manifold to the stack. In an embodiment, the reformer assembly is made of stainless steel alloy 17-4PH and can be composed of other suitable materials including Inconel, austenitic stainless steels, titanium, and Ultem or PEEK for lower temperature regions. Wall thicknesses of the reformer are nominally about 1.5 mm to provide adequate sealing of gases.

Fuel enters the reformer through tubing printed in the reformer assembly. Tubing can be printed at dimensions equal to nominal tube sizes without modification to the as printed surface to accept, for example, Swagelok fittings. Fuel passes through a heat recuperator, and then a flame arrestor with holes about 0.5 mm diameter printed within the housing at a location to maximize the area for the fuel to flow through with the least pressure drop. Other reactants, such as air, enter through printed tubing or internal pathways and are communicated to a mixing chamber that is designed to create homogeneous mixing of the reactants through vortices and turbulent boundary layers. Mixed reactants pass over an automotive glow plug or similar electric heater before entering the catalyst. The glow plug is located less than about 2 mm from the front of the catalyst to enable sufficient heat transfer to increase the front surface of the catalyst above the light-off temperature, e.g., between about 360° C. and about 560° C. The catalyst shape can be concave at the front to mirror the geometry of the glow plug to increase radiant heat transfer.

Heated reactants then enter the catalyst composed of a substrate printed simultaneously within the reformer housing. An embodiment of the 3D printed substrate is a lattice design that contains voids in multiple directions to increase surface area for enhanced catalytic reactivity and allow for increased heat transfer from the initial oxidation region of the catalyst to downstream portions of the catalyst and to the reformer body, thus increasing fuel conversion efficiency and reducing thermal degradation of the catalyst substrate. Alternatively, a commercial catalyst can be inserted into the 3D printing process during the build at a specified layer within the manufacturing process to form a highly compact device that does not require access ports for inserting the catalyst after the build.

The downstream portion of the catalyst section can be insulated as needed to increase conversion efficiency. Reformate passes through the recuperator to exchange energy with the reactants entering the reformer, and a set of tubes or helical paths around the exterior of the downstream section of the catalyst provide the convective conduit for heat transfer. Excess energy is expelled via heat exchange surfaces before passing into a manifold. The manifold contains pathways designed with smooth transitions to reduce pressure drop in the reformate and stack air supplies. The manifold acts as one of the end plate of the HT-PEM stack, containing ribs or lattice elements acting as structural members without the addition of excess mass. Additional features are printed into the reformer assembly providing a structural interface for mounting to the vehicle firewall or separate attachment points. As to minimize mass for specific applications, the reformer assembly can be printed to include the ports and sealing seats of valves and pressure regulators. Sealing surfaces can be finished with conventional machining practices as needed to enhance the surface finish for better sealing. Similarly, the housings with outlet ports for the air compressors for the reformer and stack air supplies can be printed within the assembly as required by the application.

Furthermore, an integrated 3D printed or removable volume for storage of nitrogen purge gas or other gases, such as argon or about 5% hydrogen nitrogen blends, can used for startup and shutdown procedures of the system to extend the useful life of the components. This gas volume can be actuated to purge the stack on startup and shutdown. During startup, the purge gas is used to eliminate hydrogen-air fronts that degrade cell life; purge gas is initiated just before the reformer effluent is provided to the stack. On shutdown, the purge gas can be initiated in place of the air purge in the normal shutdown sequence to purge from the stack. The stack can also be sealed with the purge gas inside the stack.

FIG. 1 illustrates a conceptual drawing of an integrated compact mobile HT-PEM system for UAV applications, showing circular MEAs and bipolar plates for UAV applications with circular airframes, connected to a printed reformer system in accordance with an embodiment of the present disclosure.

Figure 2:
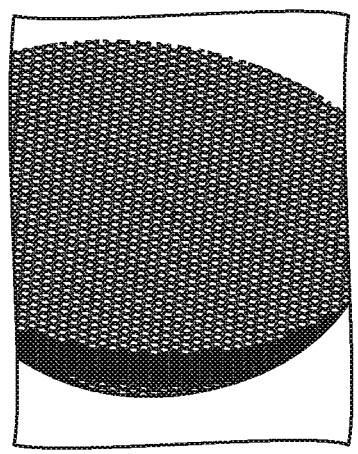
FIG. 2 is a photograph of a 3D printed metal lattice that serves as a catalyst support, in accordance with an embodiment of the present disclosure.

FIG. 2 illustrates a 3D printed metal catalyst substrate comprised of individual lattice elements, having void volumes in 3 directions around each individual lattice element, to provide increased surface area for enhanced reaction rate, in accordance with an embodiment of the present disclosure.

Figure 3:
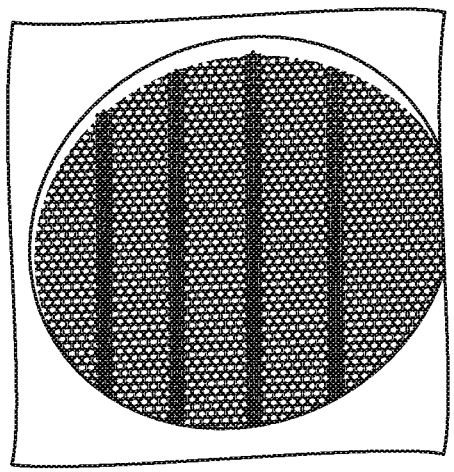
FIG. 3 is a photograph of the 3D printed metal lattice embedded in a reformer manifold section, in accordance with an embodiment of the present disclosure.

FIG. 3 illustrates a cutout showing the structural lattice embedded in a flow manifold and end plates for lightweight structural support. The lattice structure is directly connected to the solid volume that makes up the exterior, and as such, the lattice fills the otherwise hollow portion to add strength and stiffness to the component.

Figure 4:
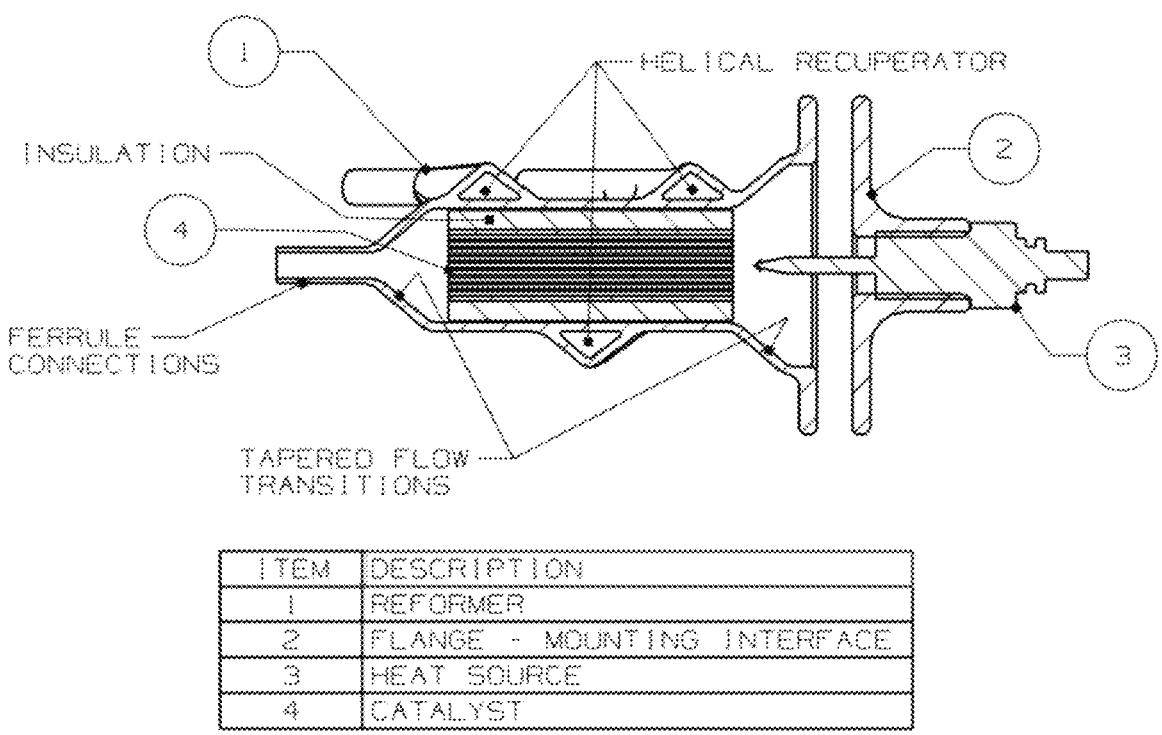
FIG. 4 is a section view drawing of a 3D printed fuel reformer device, including mixing reformer, heat source and catalyst, in accordance with an embodiment of the present disclosure.

FIG. 4 illustrates a cross-section example of a metal printed reforming system, comprised of a heat recuperator with non-circular shaped pathways to enable 3D printing. The flange design allows for insertion of commercial monolithic catalyst wrapped with insulating material to reduce temperature at the housing and to seal the catalyst to the housing. The flange also contains features for increasing the pressure on graphitic seals (not shown), mounting to the vehicle frame, and threads for attachment of the heating source.

Figure 5:
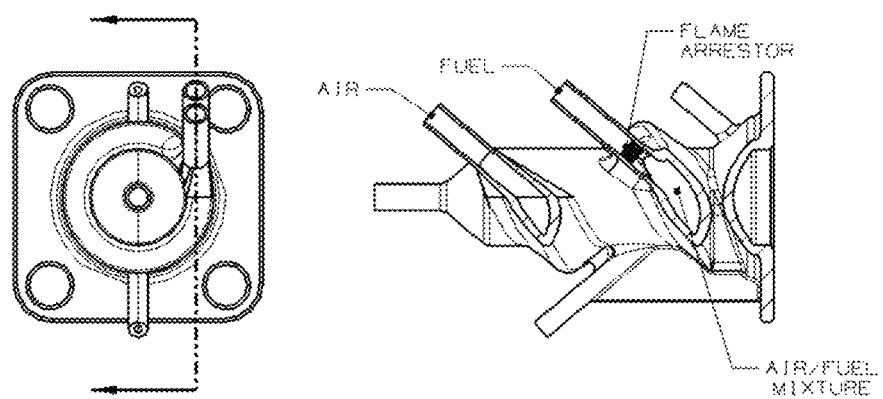
FIG. 5 illustrates a section view of the reformer describing the air and fuel inlets (including flame arrestor) in accordance with an embodiment of the present disclosure.

FIG. 5 illustrates an external view with cut away of a metal printed reforming system comprised of air and fuel inlet tubing. Air enters a heat recuperator that spirals around the outside of the catalyst housing. Fuel and air mix in a chamber designed to introduce turbulence for homogeneous mixing. Ports are provided for support and coupling of thermocouples. A flame arrestor is 3D printed in the fuel supply tube for mitigation of flashback. Structural ribs are provided for strength and to facilitate printing in powder bed DMLS printers. Features are oriented at greater than 45 degrees with respect to a base plane to enable 3D printing.

Figure 6:
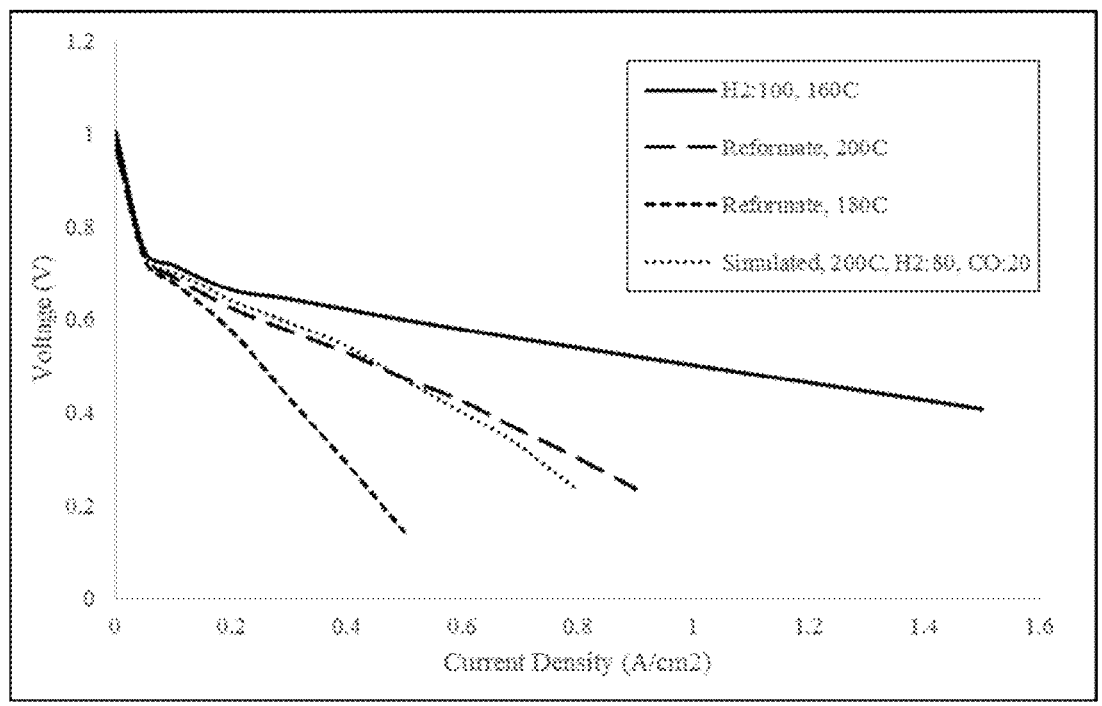
FIG. 6 illustrates representative polarization curves generated by the integrated propane fuel reformer and HT-PEM fuel cell, in accordance with an embodiment of the present disclosure.

FIG. 6 illustrates polarization curves generated by an integrated propane reformer and HT-PEM fuel cell system, constructed using a commercially procured Celtec P1100W membrane electrode assembly (MEA). When operating on actual reformate, the system performed best at about 200° C. Even though the concentration of CO in the reformate was approximately 23% (based on the propane cPOx reforming reaction), a maximum power density of 257 mW/cm$^2$ was achieved at 0.6 A/cm$^2$. The performance when operating on actual reformate compares well to the performance when operating on H$_2$ mixed with 20% CO. This comparison indicates that the CO concentration results in the majority of performance degradation rather than the hydrogen dilution. When operating on actual reformate, the fuel cell is approximately 22.5% efficient when dividing the electrical power output by the lower heating value (LHV) of the hydrogen in the anode. The overall system efficiency, computed by dividing the electrical power by the LHV of the propane consumed, is about 11.3%. When operating at about 180° C., the maximum power density was about 156 mW/cm$^2$ at a current density of about 0.4 A/cm$^2$. This corresponds to about 14% conversion efficiency when dividing the electrical power output by the LHV of the hydrogen in the anode.

Figure 7:
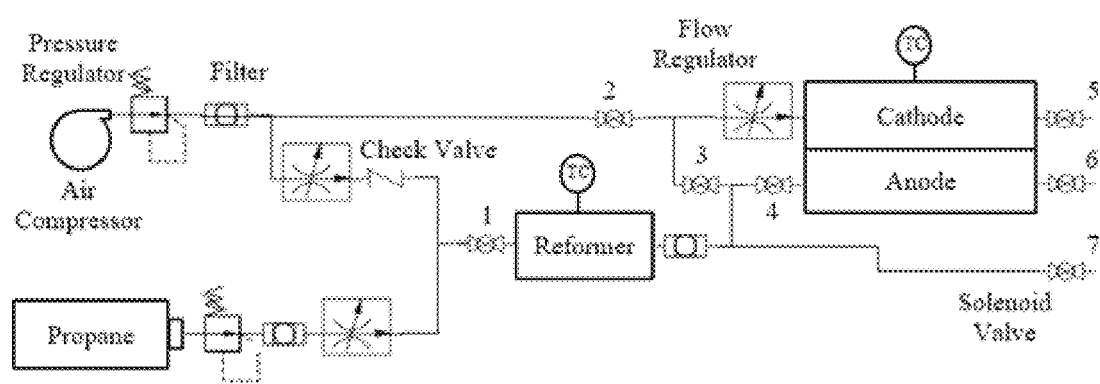
FIG. 7 illustrates an integrated system: fuel source and orifice regulator, air source and orifice regulator, heat source, reformer, catalyst, manifold, insulation, fan and HT-PEM fuel cell in accordance with an embodiment of the present disclosure.

FIG. 7 illustrates a schematic diagram of the full integrated reformer-fuel cell system design. In addition to the main system components comprised of propane supply, air compressor, fuel reformer and HT-PEM fuel cell stack, the system includes an additional seven solenoid valves (all set to normally closed), one check valve, and three filters for the full system design, although other numbers and types can be used. The filters after the air compressor and propane tank ensure no particulates flow downstream to the fuel reformer or fuel cell stack. A filter after the reformer protects the fuel cell stack in case of carbon soot formation. The check valve following the air flow regulator to the reformer ensures that propane does not flow back into the air line.

The disclosure will be further illustrated with reference to the following specific examples. It is understood that these examples are given by way of illustration and are not meant to limit the disclosure or the claims to follow.

EXAMPLE 1

Method of Operating Reformer and Fuel Cell

A propane reformer was operated under catalytic partial oxidation (cPOx) conditions, with the reformate thus produced delivered to a single-cell HT-PEM fuel cell stack composed of a polybenzimidizole (PBI)-based membrane electrode assembly. The first step of the integrated fuel reformer-stack operation procedure was to heat up the reformer catalyst to above 360° C., which is the light-off temperature of the reactor. Once the light-off temperature was reached, propane was allowed to flow at one fourth of the full rate and air flow was slowly increased until the desired operating conditions were reached. The optimal operating conditions for this reformer were O$_2$/C ratio of 0.53, and operating temperature of 940° C. Once the optimal reformer operating conditions were reached, the reformer effluent was composed of approximately 28% H$_2$, 49% N$_2$, and 23% CO. This effluent gas composition was verified using both a mass spectrometer (Applied Instrument Technologies, CA, USA) and a gas chromatograph (Model 490 Micro GC, Agilent Technologies, Santa Clara, Calif.).

The anode flow rate was controlled so that the H$_2$ amount in the anode inlet stream would provide a stoichiometric ratio of 1.5, while the cathode air flow was kept at a stoichiometric ratio of 2.0. The PBI test cell was operated at 160° C., 180° C., and 200° C. Because it was expected that sulfur in the propane would negatively impact fuel cell performance, a desulfurizer was purchased from SulfaTrap, and placed between the propane flow controller and the inlet to the propane fuel reformer. The propane used for experiments has a sulfur level of 15 ppm or less. The SulfaTrap desulfurizer was capable of reducing this amount of sulfur to levels less than 3 ppb, which would not negatively affect fuel cell performance.

Polarization curves of a commercially procured PBI-based fuel cell while operating on actual propane cPOx reformate generated on-site, are shown in FIG. 6. The polarization data was taken at various temperatures and at atmospheric pressure. Data taken at 160° C. is not shown in the figure because the voltage of the cell dropped to below 200 mV at current densities below 0.2 A/cm$^2$.

FIG. 6 sets forth polarization curves of a Celtec P1100W tested on actual reformate produced from propane cPOx at various temperatures and at atmospheric pressure and compared to simulated reformate at 200° C.

When operating on actual reformate, the PBI performed best at 200° C. Even though the concentration of CO in the reformate was approximately 23%, a maximum power density of 257 mW/cm$^2$ was achieved at 0.6 A/cm$^2$. The performance when operating on actual reformate compares well to the performance when operating on H$_2$ mixed with 20% CO.

EXAMPLE 2

3D Printing of Reformer

A reformer was manufactured using 3D metal printing on a direct metal laser sintering system using powder bed technology, and was built on a platen by melting individual layers of powdered 17-4PH metal, 0.040 micro-meters thick, together until the designed height was reached. Internal features were created during the manufacturing process producing an individual component composed of several features traditionally only offered in assembled components. The reformer had a minimum wall thickness of 1.58 mm, height less than 127 mm and a diameter less than 17.8 mm. The reformer base was created to accommodate the heating element, access for insertion and removable of the catalyst, and mounting features to mate with an existing mobile system. Internal printed features included: regulating orifices, catalyst structure, pre-heat chamber, air/fuel mixing chamber, flame arrestor, fuel inlet tube, heat exchange surfaces, structural supports, and air inlet tube.

When operating the actual 3D metal printed reformer under propane cPDX conditions, concentrations of hydrogen and carbon monoxide were produced at 26 and 18 mole percent respectively. The O$_2$/C ratio was 0.51; however, other operating conditions, including temperature and pressure, were not directly measured but hypothesized to be greater than 700° C. and 130 kPA, respectively.

EXAMPLE 3

Unmanned Aerial Vehicle (UAV) Application

To design a practical fuel cell system, a specific application was chosen to set target power, energy, weight, and size requirements. The chosen application where a fuel cell device would provide several unique advantages is a mid-sized UAV (total weight<55 lbs (25 kg), 6-10 ft (1.8-3 m) wingspan); these are mainly used in surveillance applications that require long endurance, but do not necessarily require high power densities for maneuverability.

Presently, UAVs are either powered using batteries or internal combustion engines (ICEs), which offer unique advantages but come with different drawbacks. ICEs are used to power most UAVs with long-term surveillance missions because of the extended durability afforded when fueled with a hydrocarbon fuel. Some of these UAVs can fly for over 24 hours between refueling operations. However, UAVs powered with ICE engines are often extremely noisy and therefore have to fly at high altitudes to ensure that those being surveilled cannot hear it approaching. These high altitude flights require expensive and complex optical equipment to properly view their targets from such far distances, and it is highly desirable to reduce the noise output of the propulsion system so that the flight altitude can be reduced and more cost-effective optics can be used. Additionally, most ICE engines require significant maintenance after each flight, typically with a major overhaul at 250 hours and a complete engine rebuild or replacement after 500 hours. ICEs additionally suffer from premature shut downs that may occur mid-flight, which are catastrophic.

Batteries are the other primary propulsion technology for UAVs. As batteries are much quieter than ICE engines, they allow for lower altitude flights and cheaper, less complicated optics. However, due to their low specific energy, they suffer from very short flight times that are typically no longer than 1.5 hours. As a result, UAVs powered with batteries can only be used for very short range reconnaissance missions. To watch a target for extended periods of time using a battery powered UAV, multiple UAVs are used for a single mission. At least three UAVs are in constant use for a long endurance mission, where one UAV is over the target, one is returning, and the other has just been launched towards the target. This greatly complicates and adds to the expense of each mission as several operators are required for each UAV used.

A fuel cell system has the potential to provide the advantages both batteries and ICEs offer, but with very few drawbacks. Because fuel cells generate power without any moving parts and can be fueled with energy-dense hydrocarbon fuels, they offer quiet operation, long flight times, and less maintenance than current battery and ICE technology. A fuel cell propulsion system that reliably meets the target energy, power, weight, and durability requirements would provide substantial advantages for military UAV missions. To date, however, few systems have been developed that meet the target requirements that would enable widespread adoption of fuel cells as the primary propulsion system for UAVs.

Regarding the power, energy, and weight requirements, it was also determined that existing power plants for mid-sized UAVs, including the balance-of-plant (BoP) equipment, typically take up no more than a third of the total take-off weight, while another third of the weight is taken up by the fuel and fuel tank, and the rest includes the airframe, motor, and payload. Additionally, power plants are generally designed to produce at least 35 W/kg (power per mass of the entire aircraft) for fixed wing aircraft, and 140 W/kg for helicopters and multirotor aircraft. The minimal power density of the engine and BoP equipment can be calculated as approximately 60 W/liter. However, it was described that volumetric constraints are not as important as weight constraints, providing some flexibility in power density metrics.

For selecting a target fuel cell system size, there is present need for power plants that provide approximately 250 W of net power for propulsion. In setting the target weight and volume requirements, it was assumed that the BoP equipment (electronic controller, air compressor, cooling fan, flow controllers, valves, and electronic control unit) consume approximately 20% of the total power output. Additionally, to be conservative, it was assumed that a full-sized fuel cell stack will generate a power density that is about 10% less than at the single cell level. Therefore, the gross power of the fuel cell stack should be designed assuming 30% will be lost, indicating that 360 W is needed to produce 250 W for the primary propulsion. With 250 W put towards the primary propulsion power plant, the UAV should weigh no more than 7.2 kg, and the fuel cell system including BoP equipment should weigh no more than 2.4 kg. Assuming a power density requirement of 58.3 W/liter, the total volume of the fuel cell stack and BoP equipment should be no more than 4.3 L. The fuel cell system was therefore designed to produce 360 W of power weighing no more than 2.4 kg within a 4.3 L volume.

When adding up the estimated weight from all of the different components, the total mass of the proposed integrated reformer fuel cell system is 2.23 kg, which meets the 2.4 kg weight limit target described above. The breakdown of the different components and their weights are presented in Table 1 below.

TABLE 1

Component list and weights of the proposed integrated reformer fuel cell system

| Component | Quantity | Weight (g) | Total Weight (g) |
|---|---|---|---|
| Air Compressor | 1 | 110 | 110 |
| Flow Regulator - Air | 2 | 28 | 56 |
| Flow Regulator - Propane | 1 | 6.4 | 6.4 |
| Pressure Regulator | 2 | 23 | 46 |
| Filter | 3 | 10 | 30 |
| Check Valve | 1 | 9.2 | 9.2 |
| Reformer | 1 | 57.6 | 57.6 |
| Solenoid Valve | 7 | 8.5 | 59.5 |
| Fuel Cell Stack | 1 | 682 | 853 |
| K-Type Thermocouple | 2 | 1.7 | 3.4 |
| Cooling Fans | 1 | 27 | 27 |
| ECU | 1 | 58.5 | 58.5 |
| DC-DC Converter | 1 | 221 | 221 |
| Piping | 1 | 99.5 | 99.5 |
| Battery | 1 | 600 | 600 |
| System Total | | | 2237.1 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An integrated fuel cell power system comprising:
a propane reformer comprising a propane intake, an air intake, and a catalytic partial oxidation catalyst, wherein the propane reformer operates at an $O_2/C$ ratio from about 0.5 to about 0.65, pressure from about 100 kPa to about 300 kPa, and catalyst temperature from about 800° C. to about 1000° C. to produce a reformate comprising hydrogen while minimizing creation of soot to at or below about 0.02 $mg/m^3$ and carbon monoxide from about 5% to about 25%; and a high temperature proton exchange membrane fuel cell comprising a polymer membrane which operates within a temperature range from about 160° C. to about 205° C., wherein the high temperature proton exchange membrane fuel cell operates within a temperature range from about 160° C. to about 205° C. and at pressures between about 100 kPa to about 300 kPa to produce electricity from the reformate.

2. The system of claim 1, wherein the polymer membrane comprises a polybenzimidazole (PBI) membrane.

3. The system of claim 1, wherein the polymer membrane comprises a pyridine polymer membrane.

4. The system of claim 1, wherein the catalytic partial oxidation catalyst comprises platinum, palladium, rhodium, ruthenium or iridium.

5. The system of claim 1, wherein the catalytic partial oxidation catalyst comprises a composition comprising from about 1 to 2% by weight platinum, palladium, rhodium, ruthenium or iridium.

6. A method for generating electricity from propane reformate comprising:
   controlling the propane intake, air intake, and catalytic partial oxidation catalyst operating conditions of a propane reformer to an $O_2/C$ ratio from about 0.5 to about 0.65, pressure from about 100 kPa to about 300 kPa, and catalyst temperature from about 800° C. to about 1000° C. to produce a reformate comprising hydrogen while minimizing creation of soot to at or below about 0.02 $mg/m^3$ and carbon monoxide from about 5% to about 25%; and
   controlling the operating parameters of a high temperature proton exchange membrane fuel cell comprising a polymer membrane which operates within a temperature range from about 160° C. to about 205° C., wherein the high temperature proton exchange membrane fuel cell is operated within a temperature range from about 160° C. to about 205° C. and at pressures between about 100 kPa to about 300 kPa to produce electricity from the reformate.

7. The method of claim 6, wherein the polymer membrane comprises a polybenzimidazole (PBI) membrane.

8. The method of claim 6, wherein the polymer membrane comprises a pyridine polymer membrane.

9. The method of claim 6, wherein the catalytic partial oxidation catalyst comprises platinum, palladium, rhodium, ruthenium or iridium.

10. The method of claim 6, wherein the catalytic partial oxidation catalyst comprises a composition comprising from about 1 to 2% by weight platinum, palladium, rhodium, ruthenium or iridium.

* * * * *